W. A. TEMPLE.
FOUR HORSE EVENER.
APPLICATION FILED MAR. 18, 1908.
907,651.
Patented Dec. 22, 1908.
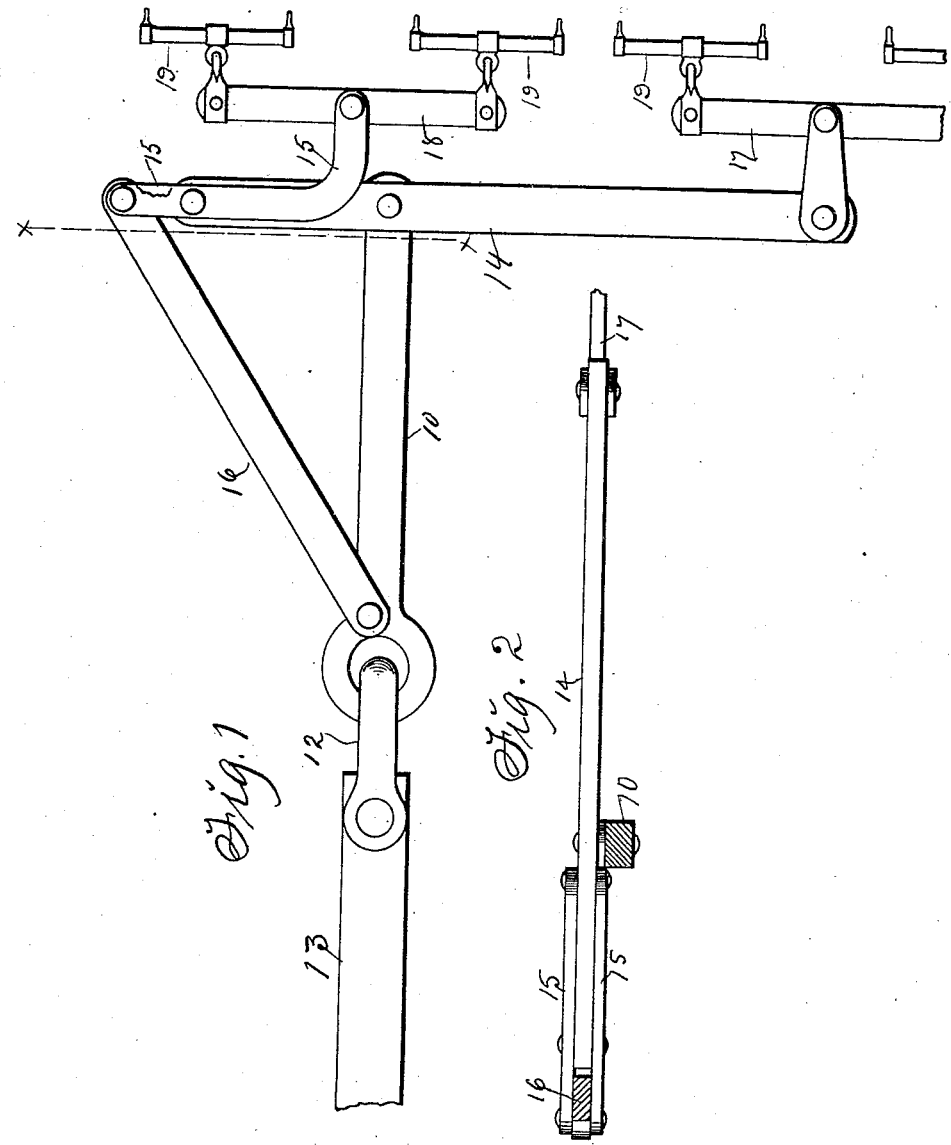

UNITED STATES PATENT OFFICE.

WILLIAM ARTHUR TEMPLE, OF KNOXVILLE, IOWA.

FOUR-HORSE EVENER.

No. 907,651.  Specification of Letters Patent.  Patented Dec. 22, 1908.

Application filed March 18, 1908. Serial No. 422,568.

*To all whom it may concern:*

Be it known that I, WILLIAM ARTHUR TEMPLE, a citizen of the United States, residing at Knoxville, in the county of Marion and State of Iowa, have invented a new and useful Four-Horse Evener, of which the following is a specification.

The object of my invention is to provide a four-horse evener adapted to be detachably and reversibly applied to a right hand or left hand plow to facilitate the operation of the plow as required to plow deep in soft or hard ground without undue fatigue or straining of horses and as required to allow one horse to walk in a furrow and the other three horses to walk on unbroken ground.

My invention consists in the construction, arrangement and combination of parts as hereinafter set forth, pointed out in my claim and illustrated in the accompanying drawings, in which:

Figure 1 is a plan view that shows my invention applied to the beam of a right-hand plow in such a manner that one horse can walk in a furrow and the other three on unplowed ground. Fig. 2 is a horizontal sectional view looking forward from the line *x x* of Fig. 1 and shows the relative positions of the overlying parts.

The numeral 10 designates a draw bar provided with an aperture at its rear end to admit a clevis 12 as required for detachably connecting it with the front end of a plow beam 13 as shown in Fig. 1. A reversible main evener 14 is pivotally connected with the front end of the draw bar 10 and two mating curved bars 15 jointly and pivotally connected in overlying position with the short arm of the evener 14 to extend outward over the end of the evener and forward therefrom at their curved ends.

It is obvious that by extending the curved bars 15 inwards to near the draw bar 10 the doubletree connected therewith will retain swingletrees on opposite sides of the line of advance occupied by the draw bar in such a manner that only one horse will be on one side of the line of the draw bar to walk in the furrow and three horses as hereinafter set forth, allowed to walk on the unbroken ground or sod when the plow is in operation.

A link or straight bar 16 is pivotally connected with the straight ends of the bars 15 and the rear end of the draw bar 10.

A doubletree 17 is pivotally connected with the long arm of the evener 14 and a second doubletree 18 with the overlying curved front ends of the mating bars 15 and swingletrees 19 are pivotally and detachably connected with the ends of the doubletrees as shown, or in any suitable way, as required for hitching horses thereto.

In the practical use of my invention one horse can walk in the furrow previously made and the other three on the unbroken ground and apply their force evenly to the plow beam as required to advance a plow forward in a straight line.

To change the evener from a right hand plow to a left hand plow the draw bar 10 must be detached from the right hand plow and inverted and then connected with the beam of the left hand plow.

It is obvious my invention can be applied to other objects or machines to be advanced.

Having thus set forth the purposes of my invention, its construction and manner of use, the practical operation and utility thereof will be obvious.

What I claim as new and desire to secure by Letters-Patent, is:—

A four horse evener for plows comprising a draw bar, means for connecting the draw bar to a plow beam, a reversible main evener, two curved bars pivoted to the end of the short arm of said evener, a link connecting said curved bars with the rear end of the draw bar, an evener connected with the free ends of said curved bars to carry swingletrees on the opposite sides of the line of the draw bar, an evener connected with the long end of the main evener and four swingletrees arranged and combined for hitching four horses to a plow as set forth, for the purposes stated.

WILLIAM ARTHUR TEMPLE.

Witnesses:
 T. V. HART,
 H. C. TEMPLE.